(12) United States Patent
Raszka

(10) Patent No.: US 12,448,562 B2
(45) Date of Patent: Oct. 21, 2025

(54) METHOD OF MANUFACTURING A PHOTOLUMINESCENT ELEMENT

(71) Applicant: EternaLight s.r.o., Navsi (CZ)

(72) Inventor: Ladislav Raszka, Navsi (CZ)

(73) Assignee: EternaLight s.r.o., Navsi (CZ)

( * ) Notice: Subject to any disclaimer, the term of this patent is extended or adjusted under 35 U.S.C. 154(b) by 963 days.

(21) Appl. No.: 17/609,829

(22) PCT Filed: Jun. 17, 2020

(86) PCT No.: PCT/CZ2020/000028
§ 371 (c)(1),
(2) Date: Nov. 9, 2021

(87) PCT Pub. No.: WO2021/000972
PCT Pub. Date: Jan. 7, 2021

(65) Prior Publication Data
US 2022/0220369 A1 Jul. 14, 2022

(30) Foreign Application Priority Data

Jul. 4, 2019 (CZ) .................................... 2019-441

(51) Int. Cl.
*B05D 1/30* (2006.01)
*B29C 33/38* (2006.01)
(Continued)

(52) U.S. Cl.
CPC ................ *C09K 11/02* (2013.01); *B05D 1/30* (2013.01); *B29C 33/38* (2013.01); *B29C 33/424* (2013.01);
(Continued)

(58) Field of Classification Search
CPC ......... B05D 1/30; B29C 33/38; B29C 33/424; B29C 33/60; B29C 33/68; B29C 43/021;
(Continued)

(56) References Cited

U.S. PATENT DOCUMENTS

| 2004/0137266 A1 | 7/2004 | Saito et al. |
| 2008/0150173 A1 | 6/2008 | To |
| 2012/0091607 A1 | 4/2012 | Sutter |

FOREIGN PATENT DOCUMENTS

| CZ | 33865 U1 * | 3/2020 |
| CZ | 2019441 A3 * | 5/2020 |

(Continued)

OTHER PUBLICATIONS

International Search Report and Written Opinion from Corresponding PCT/CZ2020/000028 Mailed Oct. 1, 2020 (9 pages).

*Primary Examiner* — William P Fletcher, III
(74) *Attorney, Agent, or Firm* — Hovey Williams LLP; Paul J. Walker

(57) ABSTRACT

A method of manufacturing a photoluminescent element (1), wherein a thick, 1000-1500 kg/m3 density transparent layer (11) is applied onto a plate (2) or into at least one mold (3) at an ambient temperature of 15-55° C. and allowed to dry for 10 minutes to 8 hours, followed by applying a thin, 100-200 mPa·s viscosity transparent layer (12). Further, a photoluminescent powder (131) is immediately applied and allowed to fall by its gravity only through the thin transparent layer (12) to adhere at the interface of both the transparent layers (11, 12) and, therefore, to form a continuous photoluminescent layer (13). All the achieved layers (11, 12, 13) are finally hardened together.

20 Claims, 3 Drawing Sheets

(51) Int. Cl.
  *B29C 33/42*    (2006.01)
  *B29C 33/60*    (2006.01)
  *B29C 33/68*    (2006.01)
  *B29C 43/02*    (2006.01)
  *B29K 105/16*   (2006.01)
  *B32B 27/08*    (2006.01)
  *B33Y 70/00*    (2020.01)
  *B33Y 80/00*    (2015.01)
  *C09K 11/00*    (2006.01)
  *C09K 11/02*    (2006.01)
  *C09K 11/77*    (2006.01)
  *B33Y 10/00*    (2015.01)

(52) U.S. Cl.
  CPC ............. *B29C 33/60* (2013.01); *B29C 33/68* (2013.01); *B29C 43/021* (2013.01); *B32B 27/08* (2013.01); *B33Y 70/00* (2014.12); *B33Y 80/00* (2014.12); *C09K 11/00* (2013.01); *C09K 11/7792* (2013.01); *B29C 2043/025* (2013.01); *B29K 2105/16* (2013.01); *B29K 2995/0018* (2013.01); *B32B 2307/422* (2013.01); *B33Y 10/00* (2014.12)

(58) Field of Classification Search
  CPC .......... B29C 2043/025; B29K 2105/16; B29K 2995/0018; C09K 11/00; C09K 11/02; C09K 11/7792; C09K 11/08; B32B 27/08; B32B 2307/422; B32B 33/00; B33Y 70/00; B33Y 80/00; B33Y 10/00
  See application file for complete search history.

(56) References Cited

FOREIGN PATENT DOCUMENTS

| | | | | |
|---|---|---|---|---|
| EP | 2774965 A1 | * | 9/2014 | ............. C09K 11/02 |
| WO | WO-2014204328 A1 | * | 12/2014 | ............. B32B 17/10 |

* cited by examiner

METHOD OF MANUFACTURING A PHOTOLUMINESCENT ELEMENT

RELATED APPLICATIONS

This application is the National Stage of International Patent Application No. PCT/CZ2020/000028, filed Jun. 17, 2020, which is hereby incorporated herein by reference in its entirety, and which claims priority to Czech Patent Application No. PV 2019-441, filed Jul. 4, 2019, which is also incorporated herein by reference in its entirety.

FIELD OF THE INVENTION

The technical solution relates to a method of manufacturing a photoluminescent element.

BACKGROUND OF THE INVENTION

From the prior art there are known methods and manufacture of photoluminescent materials which are based on mixing of photoluminescent powder into a base material. The drawback of said method consists in damage of crystals of photoluminescent powder and their dispersion in the base material that causes a reducing of a final luminance of obtained material, accurately luminance of dispersed crystals is smaller than the luminance of homogeneous layer.

There is a known solution according to patent document No. US20060162620A1, where the essence consists in the formation of encapsulated photoluminescent particles which are further deposited in the base material, in particular for use in aqueous media such as swimming pools, spas, etc.

Another known solution is one according to patent US20070022911A1, whose principle is based on the method of manufacturing a luminescent tile for use in the aquatic environment, which is based on mixing the luminescent pigment capable to illuminate an external light source, with the molding material and the catalyst to form a luminescent composition, wherein the tile is formed by casting said mixture into a mold.

Methods for applying individual layers are also known, for example according to patent document PL173588B1, A method for creating photoluminescent signs and pictograms, the essence of which consists in applying a coloured layer to a frosted glass plate and to this layer there is applied a layer consisting of a resin mixture containing a photoluminescent powder which is mixed into this resin.

Another known solution is one according to the patent in PL 200803, which discloses a method for producing a photoluminescent material, which consists in mixing photoluminescent material consisting of rare metals, colouring agent and a photoluminescent powder, where the mixing process is realized by machines generating small speed.

Said methods are based on mixing photoluminescent powder into a base material, for example resin or concrete, and as mentioned, mechanical mixing causes damage of crystals of photoluminescent powder, and thereby a reducing the luminance.

Furthermore, a solution is known according to patent document PL 402969, a method of applying of a photoluminescent coating and a photoluminescent material formed by this method, the essence of which consists in applying to the base plate a layer of resin on which a photoluminescent powder is applied which is applied into the base plate under the pressure from 3 to 8 bars. This procedure of applying of a base layer-resin altogether with compressed powder coating is repeated. The layers thus formed are repeatedly applied, and the photoluminescent powder is applied by pressure to the base layer, and a thin layer of a connective glue is applied to the last layer of the photoluminescent powder, and then the upper protective layer is applied. A disadvantage of this solution is the necessity to use pressure and further thus obtained plate and also plates manufactured by the above methods it is necessary to cut, or otherwise mechanically divide to obtain the final shape of the finished product. On the cutting edge then occurs the damage of the crystals, their crumbling away in time and also the erosion by moisture, which significantly reduces the luminance of crystals. This reduces the luminance of the product in the peripheral parts and over time the edges of the product cease to shine completely.

Solution is known from patent PL 399917, Photoluminescent materials and method of manufacturing photoluminescent material, wherein photoluminescent layer containing photoluminescent powder and a transparent binder, and preferably containing additives such as dyes and agent for strengthening the effect of luminescence, is provided with a lower and upper protective layer, where the method for producing a photoluminescent material is such that the lower layer is applied with an adhesive binder and then is sprinkled with thick layer of photoluminescent powder, significantly higher than the bonding layer, and further the surface is rolled and thus the photoluminescent powder enters the binder layer. The surplus of photoluminescent powder is removed by blowing off and the resulting coating is provided with the upper protective layer, which is rolled again. This procedure can be repeated.

Furthermore, a solution according to patent specification PL 41737 is known—A method of forming of photoluminescent boards intended for cutting, which consists in pouring a layer of transparent low-viscosity resins covered with a layer of synthetic separating waxes on a flat sheet and then forming a layer of concentrated photoluminescent powders by a template with a surface smaller than the finished product. Next, the glass mat is applied to the layer thus formed and penetrates the entire surface of the board with a low-viscosity transparent resin, the product thus obtained is further deaerated and covered with the last layer, which is a white resin.

SUMMARY OF THE INVENTION

These disadvantages are eliminated by the method of manufacturing a photoluminescent element, according to this invention, whose principle consists in that during an ambient temperature from 15-55° C. on the plate or into a mold there is applied a thick transparent layer, whose density is 1-1.5 t/m$^3$. This thick transparent layer is allowed to dry for over 8 hours to 10 minutes, and then on it is applied a thin transparent layer with a viscosity of 100 to 200 cP·s wherein immediately to this thin transparent layer a photoluminescent powder is applied. The photoluminescent powder, under the action of gravity, falls through this thin transparent layer and adheres to the interface of the two transparent layers, thus forming a continuous photoluminescent layer. Subsequently, these layers are hardened and, after hardening, the photoluminescent element is removed from the plate or mold.

It is preferred that the thick transparent layer is applied in the way that it is shaped on its profile in order to increase the surface area of the thick transparent layer, and most preferably the thick transparent layer is applied to the plate or mold in the form of pyramids, preferably the pyramids are applied repeatedly in succession and side by side.

Furthermore, it is expedient for the bottom of the plate or mold to be formed on its profile in the shape of a multi-sided pyramid, wherein the applied thick transparent layer is copying the shaped bottom of the plate or mold. After hardening, the photoluminescent element is removed from the plate or mold.

It is preferred that the bottom plate or the mold is formed in the shape of pyramids, wherein the height of the pyramid is from 0.2 to 15 mm and the angle of the wall is from 15 to 75° C.

Furthermore, it is expedient for the photoluminescent element, which is formed on the shaped bottom of the plate or mold, to be removed from the plate or mold, to be folded over on a flat-bottomed plate or mold and the molded surface to be re-filled with a levelling transparent layer.

It is preferred that a frame is mounted on the board to prevent spillage of the levelling transparent layer.

It is preferred that the mold or frame for insertion of folded photoluminescent element is in its shape about 1% to 10% larger than the photoluminescent element to facilitate the wrapping of the side surfaces of photoluminescent element by levelling transparent layer, and it is also preferable to be provided with a layer to provide easy taking our or removal.

It is expedient for the thick transparent layer to be applied by means of a 3D printing method.

Furthermore, it is expedient to make pressure by pressuring means into a thick transparent layer, which is applied on a flat bottom plate or the mold, whereby the surface of the pressuring means is shaped. In a preferred embodiment, the surface of the pressuring means is arranged in the shape of multi-sided pyramids.

It is preferred that a thin transparent layer extends beyond the thick transparent layer about 0.1 until 10 mm.

It is preferred that the plate is made as smooth and it is also preferred that the plate is provided with a layer to ensure easy removal of the photoluminescent element from the plate. It is also preferred that the mold is provided with a layer to ensure easy removal of the photoluminescent element, in a most preferred embodiment the easy removal layer is formed as a poly-film, where the base film performs the role of a heat mouldable form, and the top film performs the role of layer to ensure an easy removal of the photoluminescent element.

It is expedient to apply a white layer to the hardened layers, wherein all layers are hardened together.

It is preferable that the thickness of the thick transparent layer is 0.2-3 mm, the thickness of the thin transparent layer is 0.1-10 mm.

It is expedient for the photoluminescent powder to be applied by means of a sieve.

It is further expedient that a thin transparent layer and/or white outer layer is provided with a glass or carbon fibers for reinforcement.

Advantages of the present invention may be seen particularly in increasing and extending the length of luminance of photoluminescent elements, and also in the length of the lifespan. Another important criterion is also the achievement of economic savings in the said method of production.

EXAMPLE OF AN EMBODIMENT OF THE INVENTION

Example 1

Figure 1:
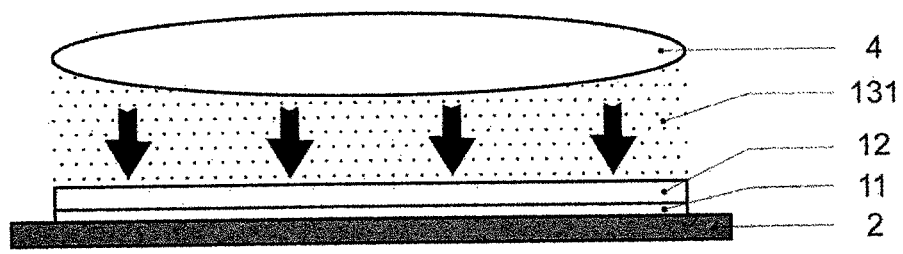
FIG. 1 shows the applying of a photoluminescent powder (131) to a thin transparent layer (12) which the photoluminescent powder (131) falls through and adheres to the interface with the thick transparent layer (11) and creates a photoluminescent layer (13), as seen in FIG. 2, wherein the plate (2) is provided with a layer (21) to provide easy removal.
Figure 2:
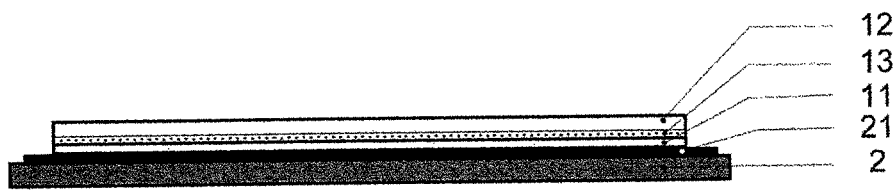
Figure 3:
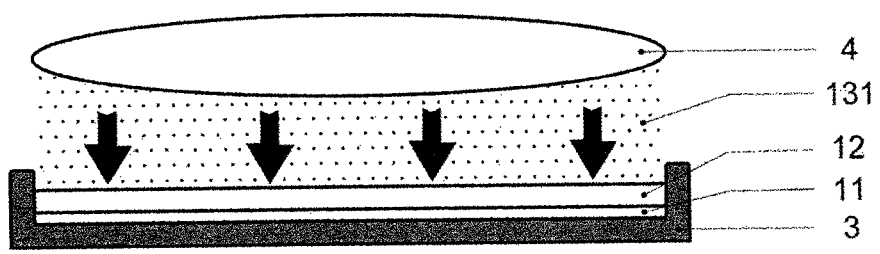
FIGS. 3 and 4 describes the applying of photoluminescent powder (131) and forming a photoluminescent layer (13) when applied in the mold (3), wherein the mold (3) is provided with a layer (31) to provide easy removal.
Figure 4:
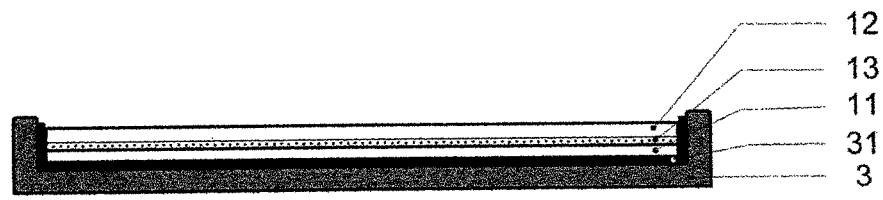
Figure 5:
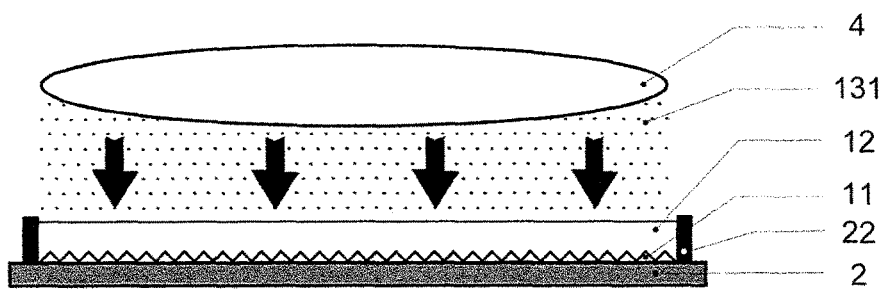
FIG. 5 shows in sectional view applying of the shaped thick transparent layer (11) on the plate (2) in such way that on the profile there is a thick transparent layer (11) spatially arranged, preferably in the shape of pyramids.
Figure 6:
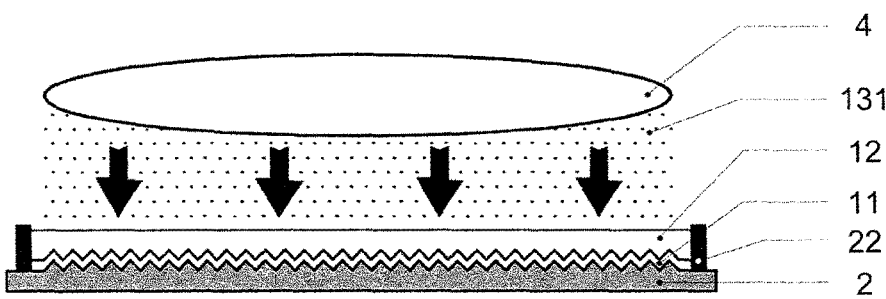
FIG. 6 is a view of the plate (2) with a shaped bottom and a applying of photoluminescent powder (131) to a thin transparent layer (12) which the photoluminescent powder (131) falls through and adheres to the interface with the thick transparent layer (11), and forms a shaped photoluminescent layer (13), as shown in FIG. 7. Here is also shown a white cover layer (14) containing glass fibers (15).
Figure 7:
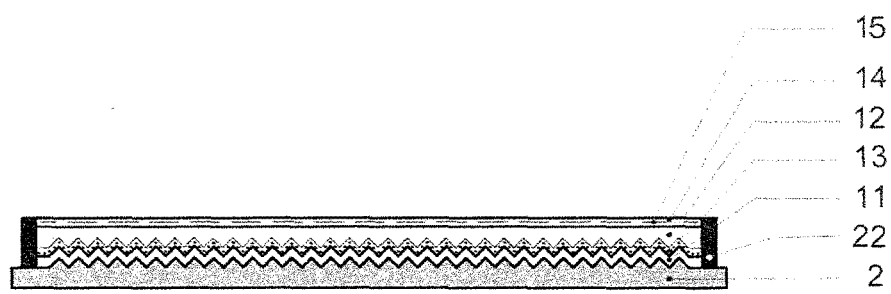
Figure 8:
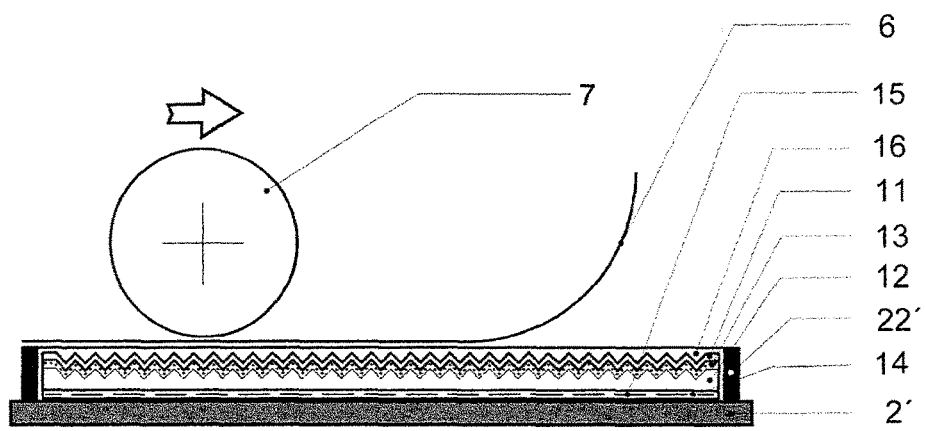
FIG. 8 in sectional view shows the plate (2') with a put folded photoluminescent element (1), where the shaped surface of the thick transparent layer (11) is re-filled with a levelling transparent layer (16). Furthermore, there is shown a method of rolling a film (6) to provide a glossy surface into a photoluminescent element (1).
Figure 9:
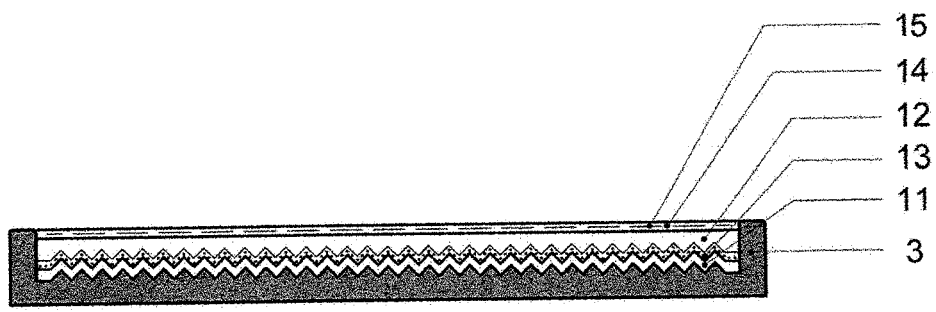
FIG. 9 shows the mold (3) with a shaped bottom and a applying of photoluminescent powder (131) to a thin transparent layer (12) which the photoluminescent powder (131) falls through and adheres to the interface with the thick transparent layer (11), and forms a spatially shaped photoluminescent layer (13). There is also displayed a white cover layer (14) containing glass fibers (15).
Figure 10:
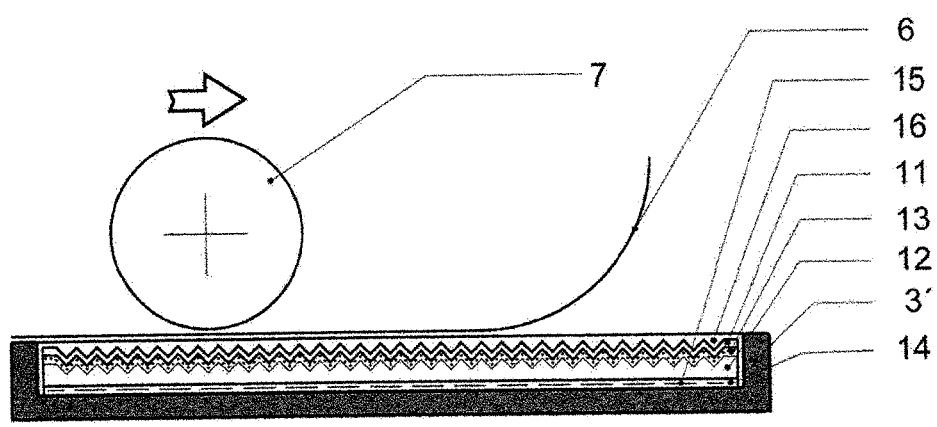
FIG. 10 in sectional view shows the mold (3') with a put folded photoluminescent element (1) wherein the spatially shaped surface of the thick transparent layer (11) is re-filled with a levelling transparent layer (16). Furthermore, there is shown a method of rolling a film (6) to provide a glossy surface into a photoluminescent element (1).
Figure 11:
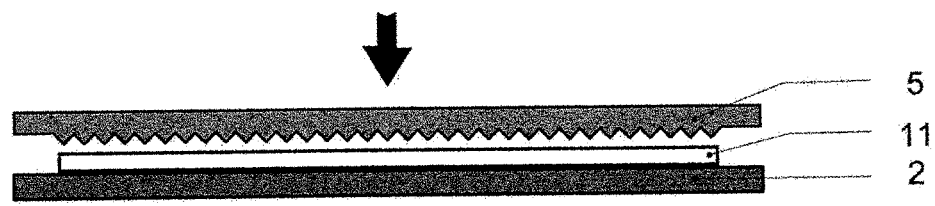
FIG. 11 shows the embodiment of the pressure by the pressuring means (5) into the thick transparent layer (11), whereby a spatially shaped surface is formed.

Method of manufacturing a photoluminescent element 1 according to the present invention consists in the fact that at temperatures in the range from 15 to 55° C., preferably at about room temperature in the range from 20 to 23° C., on the plate 2, for example a plate of hard plastic or glass, there is applied a thin layer 21 to ensure easy removal of the plate, preferably the layer is formed by pouring or spraying hot liquid wax, which is spread over the surface and solidifies at ambient temperature. On thus prepared surface a thick transparent layer 11 is applied, the density of which is 1-1.5 t/m$^3$, for example 1.1 t/m$^3$, and this layer is spread over the prepared base plate 2.

The transparent layer 11 is in a preferred embodiment a binder resin or a mixture thereof or a polyurethane mixture which is transparent. It is possible to use a matt resin, for example a polyester resin, or a glossy one, for example natural mixtures. In the most preferred embodiment, the thick transparent layer 11 is colourless and water-repellent. The thick transparent layer 11 is poured onto the plate 2, in the most preferred embodiment the pouring is performed by means of an automatic robot. The layer 11 thus prepared is left at said temperature for 150 minutes, and the surface of this layer 11 becomes cloudy in said time. The thickness of the thick transparent layer 11 is in the range 0, 1 to 20 mm, preferably 0.8 mm. On the thick transparent layer 11 a thin transparent layer 12 is poured, a viscosity of which is 100 to 200 cP·s, for example 130 cP·s, and to a thin transparent layer 12 a photoluminescent powder 131 is immediately applied, which falls by gravity through this thin transparent layer 12 and adheres to the interface of the transparent layers 11 and 12, thereby forming a continuous photoluminescent layer 13. The thickness of layer 12 is in the range 0, 1 to 20 mm, in a most preferred embodiment the thickness is 2 mm.

Photoluminescent powder 131 is introduced as a metal oxide, in a preferred embodiment the oxide $Al_2O_3$ (corundum)+Strontium+Europium+Dysprosium+Cobalt where the individual elements sinter together at temperatures above 1 000° C. and the resulting ingot is then crushed and ground into a powder of different grain sizes, so as to maintain the maximum luminance of the photoluminescent powder 131. In the most preferred embodiment, a photoluminescent powder 131 with the largest possible grain size is used, since the degree of luminance is directly proportional to the grain-crystal size. The grain size—crystals size—is from 50 μm to 650 μm, in the case of using blue luminous crystals the grain size is preferably around 50 μm, in the case of yellow-green luminous crystals the grain size is preferably from 150-200 μm.

The photoluminescent powder 131, containing large crystals, is applied with a spatula—spread on the surface of the thin transparent layer 12, in a preferred embodiment it is applied automatically by screen printing, where the speed of movement of the knife is constant. The thickness of the photoluminescence layer 13 depends on the size of the crystals and their eventual overlap, this layer 13 is preferably formed by crystals fixed side by side without overlapping. The coverage of the surface of the thick transparent layer 11 with the photoluminescent layer 13 is 70 to 100%.

Thus prepared layers 11, 12 and 13 are hardened together in order to assemble a photoluminescent element 1. Hardening is preferably carried out at temperatures of 25-55° C. at time 10 hours to 3 hours, according to the particular used material of transparent layers.

In a preferred embodiment on the hardened layer 12 a white cover layer 14 is applied, in order to increase luminance. The layers 11, 12 and 13, 14 are hardened together again by the method of the used material. The white cover layer 14 is preferably introduced as a natural or synthetic resin containing, for example, titanium dioxide. The thickness of the white cover layer 14 is 0.05-0.5 mm, most preferably 0.1 to 0.2 mm. In a preferred embodiment, the white cover layer 14 is provided with glass or carbon fibers 15 to provide strengthening.

Photoluminescent element 1 in form of a plate, manufactured as mentioned above, is ready for further processing, in the preferred embodiment, due to chip machining or water jet cutting or other dividing manufactured desired shapes, e.g., round, square or triangular elements, letters, numerals, etc.

Example 2

Method of manufacturing a photoluminescent element 1 according to the present invention consists in the fact that at a temperature, preferably at room temperature ranged between 20-23° C., a thick transparent layer 11 is applied into the mold 3, for example into the mold of hardened plastic. The shape of the mold is molded according to the requirements of the particular shape, for example the mold 3 has a circular shape of defined dimension or oval, however the shape of the mold 3 can be of any shape. Most preferably, it is a system comprising several juxtaposed molds. In a preferred embodiment this mold 3 is provided with a thin polyurethane film 31 to ensure easy removal of the photoluminescent element 1 from the mold 3, wherein the mold 3 and the polyurethane film 31 form one unit together. For example, a wax may be used as the layer 31 to ensure easy removal of the photoluminescent element 1 from the mold 3.

On the thus prepared surface in the mold 3 a thick transparent layer 11 is applied, the density of which is 1-1.5 t/m³, for example 1, 1 t/m³, and this layer is spread over the prepared base surface of the mold 3. The thick transparent layer 11 is in a preferred embodiment a binder resin or a mixture thereof or a polyurethane mixture which is transparent. It is possible to use a matt resin, for example a polyester resin, or a glossy, for example natural mixtures. In the most preferred embodiment, the thick transparent layer 11 is colourless and water-repellent. The thick transparent layer 11 is poured onto the mold 3, in the most preferred embodiment the pouring is performed by means of an automatic robot. The thus prepared layer 11 is left at this temperature for 130 minutes, and the surface of the layer 11 becomes cloudy over said time.

The thickness of thick transparent layer 11 is in the range of 0.1 to 20 mm, preferably 0.8 mm. On the thick transparent layer 11 there is poured a thin transparent layer 12, a viscosity of which is 100 to 200 cP·s, for example 110 cP·s, and on this layer 12 is immediately applied a photoluminescent powder 131, which falls by gravity through this thin transparent layer 12 and adheres to the interface of the transparent layers 11 and 12, thereby forming a continuous photoluminescent layer 13. The thickness of the thin transparent layer 12 is in the range of 0, 1 to 20 mm, in a most preferred embodiment, the thickness is of 2 mm. The photoluminescent powder 131 is presented as a metal oxide, according to Example 1. The thickness of the photoluminescence layer 13 depends on the size of the crystals and their eventual overlap, most preferably this layer consists of crystals fixed side by side without overlapping. The coverage of the surface of the thick transparent layer 11 by the photoluminescent layer 13 is 70 to 100%. Thus prepared layers 11, 12 and 13 are harden together for the purpose of assembling the photoluminescent element 1. Hardening is preferably carried out at temperatures of 25-55° C. at time from 10 to 3 hours, depending on the specific used material of transparent layers.

Then onto the hardened layer 12 there is applied a white cover layer 14, which is altogether with the layers 11, 12 and 13 hardened again by the method according to the used material of transparent layers. The white cover layer 14 is preferably introduced as a natural or synthetic resin, for example, containing titanium dioxide. The thickness of the white cover layer is 0.05 to 0.5 mm, most preferably 0.1 to 0.2 mm. In a preferred embodiment, the white cover layer 14 is provided with glass or carbon fibers 15 to provide strengthening.

The thus manufactured photoluminescent elements after hardening are simply husked or moved out of the elastic mold. The photoluminescent element 1, shaped according to the negative of the mold, is intended for direct use. In this way, highly shining products are obtained, which can be in both 2D and 3D versions.

For example, said shining article is provided with a self-adhesive film and attached to another substrate, such as polymethyle-methacrylate, polycarbonate, metal, etc.

The photoluminescent element 1 can be glued or otherwise attached to the desired location. These products are for example incorporated into the barrier around roads etc. Luminance of the surface of the product is from 160 to 220 mcd/m² over 1 hour from the illuminating by a halogen lamp with a luminance of 1 000 lux for 10 minutes, respectively by a xenon lamp with a luminance of 1 000 lux for 5 minutes. Xenon has a purpler colour of light, which provides more energy for the photoluminescent effect.

Example 3

Method of manufacturing a photoluminescent element 1 according to the present invention consists in the fact that at temperatures in the range between 15-55° C., preferably about room temperature in the range from 20 to 23° C., onto the plate 2, for example a plate of hard plastic or glass, a thin layer 21 is applied to ensure easy removal of the plate, preferably this layer is formed by pouring or spraying hot liquid wax, which spreads over the surface and solidifies at ambient temperature or a thick transparent layer is applied to the mold 3, for example to hardened plastic mold. The shape of the mold 3 is molded according to the requirements of the particular shape, for example the mold has a circular shape of defined dimension or oval shape, however the shape of the mold 3 can be of any shape, for example the mold shapes can be repeated in rows next to each other and/or one by the other.

In a preferred embodiment this mold 3 is provided with a thin polyurethane film 31 to ensure easy removal of the photoluminescent element 1 from the mold 3, for example a surface of a mold 3 is qualitatively adapted to ensure easy removal of the photoluminescent element.

On the thus prepared surface there is applied a thick transparent layer 11, the density of which is 1-1.5 t/m³, for example, 1.4 t/m³, where the density of layer 11 enables application that the thick transparent layer 11 is shaped on its profile, most preferably is in the form of pyramids, which in the most preferred embodiment are applied repeatedly next to each other and one by other, thus forming rows and then the area of the transparent layer 11 is larger. The surface prepared in this way is left to become cloudy.

The thick transparent layer 11 is in a preferred embodiment a binder resin or a mixture thereof or a polyurethane mixture which is transparent. It is possible to use a matt resin, for example a polyester resin, or a glossy, for example natural mixtures. In the most preferred embodiment, the thick transparent layer 11 is colourless and water-repellent. The thick transparent layer 11 is applied to the plate 2 or to the mold 3, in the most preferred embodiment the application is performed by means of an automatic robot.

The layer 11 thus prepared is allowed to stay at said temperature for 90 minutes, and the surface of this layer 11 becomes cloudy in said time. Height of the pyramids is from 0.2 to 12 mm. On pyramidal shaped layer 11 a thin transparent layer 12 is poured, a viscosity of which is 1 00-200 cP·s. A photoluminescent powder 131 is immediately applied to this layer 12, which gravitationally falls through this thin transparent layer 12 and adheres to the interface of the transparent layers 11 and 12, thus forming a continuous pyramid-shaped photoluminescent layer 13. The thickness of layer 12 is in the range from 0.4 to 20 mm, in a most preferred embodiment the thickness is 4 mm. Shaping of thick transparent layer 11 generates a larger area of photoluminescent layer 13 and thus, provides a greater luminance of photoluminescent element. In a preferred embodiment, the plate 2 is provided with a frame 22 to prevent from the spillage of transparent layer 12.

The photoluminescent powder 131 is presented as a metal oxide, according to Example 1. Photoluminescent powder 131 having large crystals is applied using a spatula—sprinkled on the surface of the thin transparent layer 12, preferably is applied automatically by screen printing, where the speed of movement of the knife is constant. The thickness of the photoluminescence layer 13 depends on the size of the crystals and their eventual overlap, preferably this layer consists of crystals which are established side by side without overlapping. The coverage of the surface of the thick transparent layer 11 by the photoluminescent layer 13 is 70 to 100%. The thus prepared layer 11, 12 and 13 are hardened together for the purpose of assembling the photoluminescent element 1. Hardening is preferably carried out at temperatures of 25-55° C. at time from 10 to 3 hours, depending on the specific used material of the transparent layers. Then, in the preferred embodiment, a white cover layer 14 is applied onto the hardened layer 12 in order to increase luminance. The layers 11, 12 and 13, 14 are again hardened together by method according to the used material of the layers. The white cover layer 14 is preferably introduced as a natural or synthetic resin, for example, containing titanium dioxide. The thickness of the white cover layer 14 is 0.05 to 0.5 mm, most preferably 0, 1 to 0.2 mm. In a preferred embodiment, the white cover layer 14 is provided with glass or carbon fibers 15 to provide strengthening.

Photoluminescent element 1 in form of a plate, manufactured as mentioned above, is ready for further processing, in the preferred embodiment, due to chip machining or water jet cutting or other dividing manufactured desired shapes, e.g., round, square or triangular elements. The photoluminescent element 1 produced in the mold 3 after hardening is simply husked or moved out of the elastic mold. The photoluminescent element 1, shaped according to the negative of the mold, is intended for direct use.

Example 4

Method of manufacturing a photoluminescent element 1 according to the present invention consists in the fact that at a temperature, preferably at room temperature ranged between 20-23° C., a thick transparent layer 11 is applied onto the plate 2. The bottom of the plate 2 is arranged in the form of multi-sided pyramid, for example one next to each other repeating multi-sided pyramids, in a most preferred embodiment the multi-sided pyramid is introduced as a pyramid, while the height of the pyramid is from 0.2 to 15 mm, and an angle of the wall is from 15° to 75°, most preferably a height of 6-12 mm, under the angle of the wall of 45°. The plate 2 is for example made of hard plastic or glass, on which a thin layer 21 to ensure easy removal of the plate is applied, preferably a layer is formed by pouring or spraying hot liquid wax, which is spread over the surface and solidifies at ambient temperature. It is further preferred, that the plate 2 is provided with a frame 22 to prevent spillage of the layer 12 at the edges.

On thus prepared shaped surface on the board 2 there is applied a thick transparent layer 11, the density of which is 11.5 t/m³, for example, 1.4 t/m³ and this layer is spread over the prepared molded surface of the plate 2, whereby due to the physical properties of the transparent layer 11, this layer will copy the shape of the bottom and becomes cloudy in the copied shape. The transparent layer 11 is in a preferred embodiment a binder resin or a mixture thereof or a polyurethane mixture which is transparent. It is possible to use a matt resin, for example a polyester resin, or a glossy, for example natural mixtures. In the most preferred embodiment, the thick transparent layer 11 is colourless and water-repellent. The thick transparent layer 11 is poured onto the plate 2, in the most preferred embodiment the pouring is performed by means of an automatic robot. The thickness of layer 11 is in the range of 0.1 to 20 mm, preferably 0.8 mm. On layer 11 there is poured a thin transparent layer 12, a viscosity of which is 100 to 200 cP·s. The height of the layer 12 is preferably about 0.1 to 3 mm taller than the height of the pyramid. A photoluminescent powder 131 is immediately applied to the layer 12, which gravitationally falls through this thin transparent layer 12 and adheres to the interface of the transparent layers 11 and 12, thus forming a continuous shaped photoluminescent layer 13. The thickness of layer 12 is in the range of 0, 1 to 20 mm, in a most preferred embodiment, the thickness is 2 mm.

By creating a larger real surface of photoluminescent layer 13 there is a significant increase of luminance of photoluminescent element 1.

The photoluminescent powder 131 is presented as a metal oxide, as mentioned above. The thickness of the photoluminescence layer 13 depends on the size of the crystals and their eventual m overlap, preferably this layer consists of crystals which are established side by side without overlapping. The coverage of the surface of the thick transparent layer 11 of the photoluminescent layer 13 is from 70 to 100%.

Thus prepared layer s 11, 12 and 13 are hardened together for the purpose of assembling the photoluminescent element 1. Hardening is preferably carried out at temperatures of 25-55° C. at time 10 hours to 3 hours, depending on the specific used material of the transparent layers. Then onto the hardened layer 12 the white cover layer 14 is applied, which altogether with the layers 11, 12, 13 is hardened again by the method according to the used material of the layers. The white cover layer 14 is preferably introduced as a natural or synthetic resin, for example, containing titanium dioxide. The thickness of the white cover layer 14 is 0.05 to 0.5 mm, most preferably 0.1 to 0.2 mm. In a preferred embodiment, the white cover layer 14 is provided with glass or carbon fibers 15 to provide strengthening. The photoluminescent element 1 in the form of a plate, produced in the manner described above, is ready for further processing, in a preferred embodiment the desired shapes, e.g. round, square or triangular elements, are made by means of chip machining or other material separation methods.

To ensure long-term luminance of molded photoluminescent layer 13 a photoluminescent element 1 is removed from the plate 2, turned around and inserted onto the plate 2' provided with a frame 22', wherein the frame 22' is preferably about 6% larger than the photoluminescent element 1, and shaped surface is filled with a levelling transparent layer 16. The levelling layer 16 flows around the whole photoluminescent element 1, thereby avoiding distortion and degradation of the luminous layer of photoluminescent element 1. For example, the plate 2' is equipped with layer 21' to ensure easy removal. Furthermore, in a preferred embodiment, the levelling transparent layer 16 is provided with a film 6 for providing a smooth and glossy surface, which is incorporated into the surface of the photoluminescent element 1 by a rolling device 7.

The photoluminescent element 1, in the form of a plate, produced in the manner mentioned above, is ready for further processing, in a preferred embodiment the desired shapes are made by means of chip machining or water jet cutting or other means of division, e.g. round, square or triangular elements, letters, numbers etc. For example, said luminous article is provided with a self-adhesive film and attached to another surface, such as polymethyle methacrylate, polycarbonate, metal, etc. The attachment of the photoluminescent element 1 is also possible with glue, sealant or other known attachment methods.

These products are for example incorporated into the barrier around roads etc. The luminance of the surface of the article is from 160 to 220 mcd/m$^2$ over 1 hour from illuminating by the halogen lamp of a luminance of 1 000 lux for 10 minutes, respectively by a xenon lamp with a luminance of 1 000 lux for 5 minutes. Xenon has a purpler colour of light, which provides more energy for the photoluminescent effect.

Example 5

Method of manufacturing a photoluminescent element 1 according to the present invention consists in the fact that at a temperature, preferably at room temperature ranged between 20-23° C., into the mold 3 a thick transparent layer 11 is applied. The bottom of the plate 2 is arranged in the form of multi-sided pyramid, for example one next to each other repeating multi-sided pyramids, in a most preferred embodiment the multi-sided pyramid is introduced as a pyramid, while the height of the pyramid is from 0.2 to 15 mm, and an angle of the wall is from 15° to 75°, most preferably a height of 6-12 mm, under the angle of the wall of 45°. The mold 3 is preferably made of hardened plastic and the shape of the mold is molded according to the requirements of the particular shape, for example the mold has a circular shape of defined size or oval, however the shape of the mold 3 can be of any shape. In the most preferred embodiment the system is arranged in rows next to each other and/or several molds in series. In a preferred embodiment, this mold 3 is provided with a thin polyurethane film 31 to ensure easy removal of the photoluminescent element 1 from the mold 3.

On the thus prepared substrate surface shaped in the mold 3 a thick transparent layer 11 is applied, the density of which is 1-1.5 t/m3, and this layer is spread over the prepared shaped surface of the bottom of the mold 3, wherein with respect to the physical properties of the transparent layer 11 this layer will copy the shape of the bottom and become cloudy in the copied shape. The transparent layer 11 is in a preferred embodiment a binder resin or a mixture thereof or a polyurethane mixture which is transparent. It is possible to use a matt resin, for example a polyester resin, or a glossy, for example natural mixtures. In the most preferred embodiment the thick transparent layer 11 is colourless and water-repellent. The thick transparent layer 11 is poured into the mold 3, in the most preferred embodiment the pouring is performed by means of an automatic robot. The thickness of layer 11 is in the range of 0.1 to 20 mm, preferably 0.8 mm. Onto the layer 11 a thin transparent layer 12 is poured with a viscosity of 100 to 200 cP·s. The height of layer 12 is preferably about 0.1 to 3 mm taller than the height of the pyramid. A photoluminescent powder 131 is immediately applied onto the layer 12, which gravitationally falls through this thin transparent layer 12 and adheres to the interface of the transparent layers 11 and 12, thereby forming a continuous shaped photoluminescent layer 13. The thickness of layer 12 is in the range of 0.1 to 20 mm, in a most preferred embodiment, the thickness is 2 mm.

By creating a larger real surface of photoluminescent layer 13 there is a significant increase of luminance of photoluminescent element 1.

The photoluminescent powder 131 is presented as a metal oxide, as mentioned above, including coating density.

Thus prepared layers 11, 12 and 13 are hardened together for the purpose of assembling the photoluminescent element 1. Hardening is preferably carried out at temperatures of 25-55° C. at time 10 hours to 3 hours, depending on the specific used material of the transparent layers. Then onto the hardened layer 12 the white cover layer 14 is applied, which altogether with the layers 11, 12, 13 is hardened again by the method according to the used material of the layers. The white cover layer 14 is preferably introduced as a natural or synthetic resin, for example, containing titanium dioxide. The thickness of the white cover layer 14 is 0.05 to 0.5 mm, most preferably 0.1 to 0.2 mm. In a preferred embodiment, the white cover layer 14 is provided with glass or carbon fibers 15 to provide strengthening. The photoluminescent elements 1 formed in the molds 3 after hardening are simply husked or moved out of the elastic mold and are ready for direct use.

To ensure the long-term luminance of the shaped photoluminescent layer 13, the photoluminescent element 1 is removed from the mold 3, turned around and inserted into the mold 3' while being preferred that the mold 3' is about 7 percent larger than the photoluminescent element 1, and shaped surface is filled with a levelling transparent layer 16. The levelling layer 16 flows around the whole photoluminescent element 1, thereby avoiding distortion and degradation of the luminous layer of photoluminescent element 1. For example, the mold 3' is equipped with layer 31' to ensure easy removal. Furthermore, in a preferred embodiment, the levelling transparent layer 16 is provided with a film 6 for providing a smooth and glossy surface, which is incorporated into the surface of the photoluminescent element 1 by a rolling device 7.

For example, said luminous article is provided with a self-adhesive film and attached to another surface, such as polymethyle methacrylate, polycarbonate, metal, etc. The attachment of the photoluminescent element 1 is also possible with glue, sealant or other known attachment methods.

These products are for example incorporated into the barrier around roads etc. The luminance of the surface of the article is from 160 to 220 mcd/m$^2$ over 1 hour from illuminating by the halogen lamp of a luminance of 1 000 lux for 10 minutes, respectively by a xenon lamp with a luminance of 1 000 lux for 5 minutes. Xenon has a purpler colour of light, which provides more energy for the photoluminescent effect.

Example 6

Method of manufacturing a photoluminescent element 1 according to the present invention consists in the fact that at temperatures in the range from 15 to 55° C., preferably at about room temperature in the range from 20 to 23° C., on the plate 2, for example a plate of hard plastic or glass, there is applied a thin layer 21 to ensure easy removal of the plate, preferably the layer is formed by pouring or spraying hot liquid wax, which is spread over the surface and solidifies at ambient temperature. On thus prepared surface a thick transparent layer 11 is applied, the density of which is 1-1.5 t/m$^3$, for example 1.1 t/m$^3$, and this layer is spread over the prepared base plate 2. The thick transparent layer 11 is in a preferred embodiment a binder resin or a mixture thereof or a polyurethane mixture which is transparent, same as mentioned above. In the most preferred embodiment, the thick transparent layer 11 is colourless and water-repellent. The thick transparent layer 11 is poured onto the plate 2, in the most preferred embodiment the pouring is performed by means of an automatic robot. The layer 11 thus prepared is left at said temperature for 80-350 minutes, and the surface of this layer 11 becomes cloudy in said time. The thickness of the thick transparent layer 11 is in the range 0, 1 to 20 mm, preferably 0.8 mm.

Into the thick transparent layer 11 a pressure is made by pressuring means, wherein the pressuring means 5 has a shaped surface. As a result, the thick transparent layer 11 is formed and its area is larger. Most preferably, the shaped surface is pyramidal. On the thick transparent layer 11 a thin transparent layer 12 is poured with a viscosity of 100 to 200 cP·s, and a photoluminescent powder 131 is immediately applied onto the thin transparent layer 12, which falls by gravity through this thin transparent layer 12 and adheres to the interface of the transparent layers 11 and 12, thereby forming a continuous photoluminescent layer 13.

Reached photoluminescent layer 13 has a significantly greater area and thereby a higher luminance is achieved. The thickness of the thin transparent layer 12 is in the range of 0.1 to 20 mm, in a most preferred embodiment, the thickness is 2 mm.

Photoluminescent powder 131 is presented as a metal oxide as mentioned above, including its percentage coverage.

Thus prepared layers 11, 12 and 13 are hardened together for the purpose of assembling the photoluminescent element 1. Hardening is preferably carried out at temperatures of 25-55° C. at time from 10 hours to 3 hours, depending on the specific used material of the transparent layers.

In a preferred embodiment, a white cover layer 14 is applied to the hardened layer 12 to increase luminance. Layers 11, 12 and 13, 14 are hardened together again depending on the material used. The white cover layer 14 is preferably a natural or artificial resin containing, for example, titanium white. The thickness of the white cover layer 14 is 0.05 to 0.5 mm, most preferably 0.1 to 0.2 mm. In a preferred embodiment, the white cover layer 14 is provided with glass or carbon fibers 15 to provide strengthening.

The photoluminescent element 1, in the form of a plate, produced in the manner described above, is ready for further processing, in a preferred embodiment the desired shapes are made by means of chip machining or water jet cutting or other means of division, e.g. round, square or triangular elements, letters, numbers, etc.

Example 7

Method of manufacturing a photoluminescent element 1 according to the present invention consists in the fact that at a temperature, preferably at room temperature ranged between 20-23° C., a thick transparent layer 11 is applied into the mold 3, for example into the mold of hardened plastic. The shape of the mold is molded according to the requirements of the particular shape, for example the mold 3 has a circular shape of defined dimension or oval, however the shape of the mold 3 can be of any shape. Most preferably, it is a plate comprising several juxtaposed molds. In a preferred embodiment this mold 3 is provided with a thin polyurethane film 31 to ensure easy removal of the photoluminescent element 1 from the mold 3, wherein the mold 3 and the polyurethane film 31 form one unit together. For example, a wax may be used as the layer 31 to ensure easy removal of the photoluminescent element 1 from the mold 3.

On the thus prepared surface in the mold 3 a thick transparent layer 11 is applied, the density of which is 1-1.5 t/m³, and this layer is spread over the prepared base surface of the mold 3. The transparent layer 11 is in a preferred embodiment a binder resin or a mixture thereof or a polyurethane mixture which is transparent. It is possible to use a matt resin, for example a polyester resin, or a glossy, for example natural mixtures. In the most preferred embodiment, the thick transparent layer 11 is colourless and water-repellent. The thick transparent layer 11 is poured onto the mold 3, in the most preferred embodiment the pouring is performed by means of an automatic robot. The thus prepared layer 11 is left at said temperature for a period of 80-150 min, the surface of this layer 11 becomes cloudy in said time. The thickness of the thick transparent layer 11 is in the range 0, 1 to 20 mm, preferably 0.8 mm. Into the thick transparent layer 11 a pressure is made by pressuring means, wherein the pressuring means 5 has a shaped surface. As a result, the thick transparent layer 11 is formed and its area is larger. Most preferably, the shaped surface is pyramidal.

On the thick transparent layer 11 a thin transparent layer 12 is poured with a viscosity of 100 to 200 cP·s, and a photoluminescent powder 131 is immediately applied onto the thin transparent layer 12, which falls by gravity through this thin transparent layer 12 and adheres to the interface of the transparent layers 11 and 2 thereby forming a continuous photoluminescent layer 13. The thickness of layer 12 is in the range of 0.1 to 20 mm, in a most preferred embodiment, the thickness is 2 mm. Photoluminescent powder 131 is introduced as a metal oxide, identically as described above. The layers 11, 12 and 13 thus prepared are hardened together in order to assemble the photoluminescent element 1. Hardening is preferably carried out at temperatures of 25-55° C. at time from 10 to 3 hours, depending on the specific used material of the transparent layers.

Then onto the hardened layer 12 the white cover layer 14 is applied, which altogether with the layers 11, 12, 13 is hardened again by the method according to the used material of the transparent layers. The white cover layer 14 is preferably introduced as a natural or synthetic resin, for example, containing titanium dioxide. The thickness of the white cover layer 14 is 0.05 to 0.5 mm, most preferably 0.1 to 0.2 mm. In a preferred embodiment, the white cover layer 14 is provided with glass or carbon fibers 15 to provide strengthening.

The thus manufactured photoluminescent elements after hardening are simply husked or moved out of the elastic mold. The photoluminescent element 1, shaped according to the negative of the mold, is intended for direct use. In this way, highly shining products are obtained, which can be in both 2D and 3D versions.

For example, said shining article is provided with a self-adhesive film and attached to another substrate, such as polymethyle-methacrylate, polycarbonate, metal, etc.

The photoluminescent element 1 can be glued or otherwise attached to the desired location. These products are for example incorporated into the barrier around roads etc. Luminance of the surface of the product is from 160 to 220 mcd/m² over 1 hour from the illuminating by a halogen lamp with a luminance of 1 000 lux for 10 minutes, respectively by a xenon lamp with a luminance of 1 000 lux for 5 minutes.

LIST OF REFERENCE NUMBERS 1 photoluminescent element
11 thick transparent layer
12 thin transparent layer
13 photoluminescent layer
131 photoluminescent powder
14 white cover layer
15 glass or carbon fibers
16 levelling transparent layer
2, 2' plate
21, 21' layer to provide easy removal
22 frame of the plate
22' larger frame of the plate
3 mold
3' larger mold
31, 31" layer to provide easy removal
4 screen printing knife or cartridge of photoluminescent powder
5 pressing means
6 film to provide a smooth and glossy surface
7 rolling device

The invention claimed is:

1. A method of manufacturing a photoluminescent element comprising:
   (a) applying a first transparent layer having a density of 1 to 1.5 t/m³ at an ambient temperature of 15-55° C. onto a plate or into at least one mold;
   (b) drying the first transparent layer for 10 minutes to 8 hours;
   (c) applying a second transparent layer having a viscosity from 100 to 200 cPs;
   (d) applying a photoluminescent powder to the second transparent layer,
   wherein the photoluminescent powder falls by gravity through the second transparent layer and adheres at an interface of the first transparent layer and the second transparent layer thereby forming a continuous photoluminescent layer; and
   (e) hardening the first transparent layer, the second transparent layer, and the photoluminescent layer.

2. The method of manufacturing the photoluminescent element according to claim 1, characterized in that the first transparent layer is applied in a way that it is shaped on its profile in order to increase the surface area of the first transparent layer.

3. The method of manufacturing the photoluminescent element according to claim 1, characterized in that a shaped bottom of the plate or the mold is shaped into multi-sided pyramids, wherein the first transparent layer copies the shaped bottom of the plate or the mold.

4. The method of manufacturing the photoluminescent element according to claim 3, wherein each of the pyramids in the multi-sided pyramids has a height from 0.2 to 15 mm and the wall angle is from 15° up to 75°.

5. The method of manufacturing the photoluminescent element according to claim 3, wherein the photoluminescent element has a first surface contacting the plate, wherein the photoluminescent element is then removed from the plate, turned around and placed on a flat-bottomed plate so that a second surface of the photoluminescent element opposite the first surface is contacting the flat-bottomed plate, and a shaped surface of the photoluminescent element is filled with a levelling transparent layer.

6. The method of manufacturing the photoluminescent element according to claim 5, characterized in that the plate and/or the flat-bottom plate are provided with a frame, wherein the frame is about 1% to 10% larger in shape than the photoluminescent element to allow the levelling transparent layer to flow around the side surfaces of the photoluminescent element.

7. The method of manufacturing the photoluminescent element according to claim 3, wherein the photoluminescent element has a first surface contacting the mold, wherein the photoluminescent element is removed from the mold, turned around and inserted into a flat-bottomed mold so that a second surface of the photoluminescent element opposite the first surface is contacting the flat-bottomed mold, and a surface of the photoluminescent element is filled with a levelling transparent layer.

8. The method of manufacturing the photoluminescent element according to claim 7, characterized in that the flat-bottomed mold is about 1% to 10% larger in shape than the photoluminescent element to allow the levelling transparent layer to flow around the side surfaces of the photoluminescent element.

9. The method of manufacturing the photoluminescent element according to claim 1, characterized in that the first transparent layer is applied by a method of 3D printing.

10. The method of manufacturing the photoluminescent element according to claim 1, characterized in that into the first transparent layer a pressure is made by pressuring means, wherein the pressuring means is shaped.

11. The method of manufacturing the photoluminescent element according to claim 10, characterized in that the pressing means comprises a pressing surface, wherein the pressing surface of the pressing means is arranged in the shape of multi-sided pyramids.

12. The method of manufacturing the photoluminescent element according to claim 1, characterized in that the second transparent layer overlaps the first transparent layer on top of the first transparent layer by about 0.1 to 20 mm.

13. The method of manufacturing the photoluminescent element according to claim 1, characterized in that the bottom of the plate is arranged as smooth.

14. The method of manufacturing the photoluminescent element according to claim 12, characterized in that the plate is provided with an additional layer to ensure an easy removal of the plate from the of photoluminescent element.

15. The method of manufacturing the photoluminescent element according to claim 1, characterized in that the mold is provided with a secondary layer to ensure easy removal of the photoluminescent element.

16. The method of manufacturing the photoluminescent element according to claim 15, characterized in that the secondary layer is formed as a poly-film.

17. The method of manufacturing the photoluminescent element according to claim 1, characterized in that a white cover layer is applied onto the first transparent layer, the second transparent layer, and the photoluminescent layer after the hardening, wherein the first transparent layer, the second transparent layer, and the photoluminescent layer are hardened together.

18. The method of manufacturing the photoluminescent element according to claim 17, characterized in that the thickness of the white cover layer is from 0.1 to 10 mm.

19. The method of manufacturing the photoluminescent element according to claim 1, characterized in that the photoluminescent powder is applied on the second transparent layer with a sieve.

20. The method of manufacturing the photoluminescent element according to claim 17, characterized in that the second transparent layer and/or the white cover layer are provided with glass or carbon fibers to provide strengthening.

* * * * *